(12) United States Patent
Oldfield

(10) Patent No.: US 6,995,903 B1
(45) Date of Patent: Feb. 7, 2006

(54) MICROSCOPE, A METHOD FOR MANUFACTURING A MICROSCOPE AND A METHOD FOR OPERATING A MICROSCOPE

(75) Inventor: Harry Oldfield, Shropshire (GB)

(73) Assignee: Oldfield Sciences Limited, Cheshire (GB)

( * ) Notice: Subject to any disclaimer, the term of this patent is extended or adjusted under 35 U.S.C. 154(b) by 0 days.

(21) Appl. No.: 10/111,319

(22) PCT Filed: Dec. 23, 1999

(86) PCT No.: PCT/GB99/04414

§ 371 (c)(1),
(2), (4) Date: Apr. 24, 2002

(87) PCT Pub. No.: WO01/48529

PCT Pub. Date: Jul. 5, 2001

(51) Int. Cl.
*G02B 21/06* (2006.01)
*G02B 21/00* (2006.01)

(52) U.S. Cl. ...................... 359/388; 359/368; 359/385; 359/567

(58) Field of Classification Search ........ 359/368–390, 359/554–576
See application file for complete search history.

(56) References Cited

U.S. PATENT DOCUMENTS

| | | | |
|---|---|---|---|
| 3,186,296 A | 6/1965 | Erban | 359/385 |
| 3,710,091 A | 1/1973 | Holcomb | 359/385 |
| 3,895,854 A | 7/1975 | Ziffer | 359/385 |
| 4,963,724 A * | 10/1990 | Neumann | 250/201.3 |
| 5,274,435 A * | 12/1993 | Hettrick | 356/328 |
| 5,729,383 A * | 3/1998 | Chastang et al. | 359/385 |
| 5,734,498 A | 3/1998 | Krasieva et al. | 359/382 |
| 5,777,784 A * | 7/1998 | Tanaka | 359/388 |
| 5,835,262 A | 11/1998 | Iketaki et al. | 359/352 |
| 5,835,263 A * | 11/1998 | Dobschal | 359/369 |
| 5,995,281 A * | 11/1999 | Simon et al. | 359/368 |
| 6,341,036 B1 * | 1/2002 | Tearney et al. | 359/368 |

FOREIGN PATENT DOCUMENTS

| | | | |
|---|---|---|---|
| DE | 88 02 996.4 | 6/1988 | |
| DE | 43 18 851 | * 12/1994 | 359/385 |
| EP | 0 327 425 | 8/1989 | |

* cited by examiner

Primary Examiner—Thong Q Nguyen
(74) Attorney, Agent, or Firm—Young & Thompson

(57) ABSTRACT

A microscope including a source of light, adjustable in frequency and intensity, a method of operating such a microscope, and a method for manufacturing such a microscope are described. Typically, there is provided a microscope comprising an illumination source for illuminating a subject, the illumination source comprising: a source of polychromatic light; elements for selecting a combination of frequencies from among the frequencies of the polychromatic light at selected respective relative intensities to one another, to provide non-white, polychromatic light for illuminating a subject.

9 Claims, 4 Drawing Sheets

MICROSCOPE, A METHOD FOR MANUFACTURING A MICROSCOPE AND A METHOD FOR OPERATING A MICROSCOPE

BACKGROUND OF THE INVENTION

The present invention relates to microscopes, and in particular to improvements in optical transmission microscopes.

DESCRIPTION OF THE RELATED ART

A typical transmission microscope comprises a light source arranged to supply light to a lower surface of a subject to be viewed. The light may be concentrated by a condenser comprising one or more lenses before reaching the subject. The light reaches the subject, which is mounted on a transparent mount in the path of illumination. Transmission microscopes are usually used for observing subjects which are transparent. The light passes through and around the subject, and is received into an objective, comprising an objective lens and an eyepiece.

When the light passes through and around the subject, the light way be reflected, diffracted, for example at the edges of the subject, absorbed, transmitted with a phase shift, scattered or otherwise modified.

The combination of the modifications imparted to the light by the object produces an image of the subject, which may be observed at the eyepiece.

It is well known to use monochromatic light sources or filters so that monochromatic light illuminates the subject and reaches the eyepiece. Such filters may be used in conjunction with staining of the subject or as an alternative to straining.

Transmission microscopes are often used to observe biological subjects. Biological subjects are often transparent, and difficult to observe. One known apparatus for observing such subjects is the phase-contrast microscope. When light travels through a transparent subject, its phase may be changed. A phase contrast microscope uses an annular diaphragm in the condenser and an annular waveplate in the objective, to provide interference between the diffracted and undiffracted light, observable as an image.

This operation may be used in conjunction with a system of monochromatic filters.

A further optional feature well-known in conjunction with transmission microscopes is dark-field. In this case, the light source is prevented from shining directly into the objective, either by placing an opaque disc in the condenser below the subject, or by illuminating the subject at an oblique angle. In either case, the subject is lit by peripheral light from the light source, and only light which is diffracted, or reflected by the subject can enter the objective to be observable.

In the various known transmission microscopes, each has a limit to the resolution and the features that are observable in any subject. By using dark field or phase contrast techniques, only a limited amount of light can reach the objective to form an image. This leads to the image being relatively dark, and details are difficult to observe. If monochromatic filters are used, again, much of the available light is excluded from the final image. To produce improvements in resolution and brightness, very complex expensive microscopes are necessary.

Alternatives to optical microscopes may also be considered, though these types also often result in killing the subject.

For observing biological samples, it has become common practice to stain the samples, and then observe them with a reflected-light microscope, that is, one in which the subject is observed from the same side as that by which it is illuminated. Staining of samples involves use of potentially harmful chemicals which typically also kill the subject to be studied. The staining is required to allow details of the transparent subject to be visible in the reflection microscope.

SUMMARY OF THE INVENTION

It would be advantageous to provide a microscope of relatively simple construction which enables greater detail of a transparent subject to be observed, without staining. This would allow biological subjects to be observed in their living state, and would avoid the need to handle staining chemicals.

Accordingly, there is provided a microscope comprising an illumination source for illuminating a subject, the illumination source comprising:
  a source of polychromatic light;
  means for selecting a combination of frequencies from among the frequencies of the polychromatic light at selected respective relative intensities to one another, to provide non-white, polychromatic light for illuminating a subject.

According to a further aspect there is provided a method of operating a microscope comprising the steps of:
  providing a source of polychromatic light;
  selecting a combination of frequencies from among the frequencies of the polychromatic light at selected respective relative intensities to one another to provide non-white, polychromatic light;
  illuminating a subject with the non-white polychromatic light.

According to a further aspect there is provided a method of manufacturing a microscope comprising the steps of:
  providing a source of polychromatic light;
  providing means for selecting a combination of frequencies from among the frequencies of the polychromatic light at selected respective relative intensities to one another to provide non-white, polychromatic light;
  providing means for illuminating a subject with the non-white, polychromatic light.

Preferably the polychromatic light from the source contains a plurality of frequencies, at predetermined fixed respective relative intensities to one another.

Preferably the frequencies of the selected combination of frequencies bear a known or determinable intensity ratio to one another.

Preferably the selected frequencies can be varied.

Preferably the respective relative intensities of the selected frequencies in the light for illuminating a subject can be varied.

Preferably an aperture is provided, through which the selected frequencies pass.

Preferably a variable size aperture which can be adjusted in size is provided to vary the selection of the selected combination of frequencies and/or the selected respective relative intensities.

Preferably at least one diffraction grating is used for selecting, at least in part, the selected frequencies at the selected relative intensities.

Preferably the at least one diffraction grating is illuminated by the source of polychromatic light.

Preferably at least one diffraction grating is a reflective diffraction grating.

Preferably at least one diffraction grating is a transmission diffraction grating.

Preferably an angle of incidence of illumination of one or more diffraction grating(s) may be varied, so as to vary the selection of the selected combination of frequencies and/or the selected respective relative intensities.

Preferably an angle of orientation of one or more diffraction grating(s) with respect to the subject may be varied, so as to vary the selection of the selected combination of frequencies and/or the selected respective relative intensities.

Preferably a prism is used for selecting, at least in part, the selected frequencies at the selected relative intensities.

Preferably the prism is illuminated by the source of polychromatic light.

Preferably the selected combination of frequencies comprises a continuous part of a frequency spectrum.

Preferably the source of polychromatic light is a source of white light.

Preferably the source of polychromatic light comprises an incandescent light bulb.

Preferably a transmission diffraction grating is placed in the path of the non-white polychromatic light, before the subject.

Preferably the transmission diffraction grating is located in a plane substantially perpendicular to the path of the non-white polychromatic light.

Preferably the illumination source further comprises a condenser located for focusing the non-white polychromatic light onto the subject.

In an embodiment of the invention, the selected combination of frequencies may be generated by combining light from a number of sources, each generating light of a restricted range of frequencies. In such an embodiment, relative intensities of the frequencies may be adjusted by adjusting the brightness of each source, such as by using associated dimmers.

BRIEF DESCRIPTION OF THE DRAWINGS

Preferred embodiments of the present invention will now be described in detail, by way of example only, with reference to the accompanying drawings, in which.

DESCRIPTION OF THE PREFERRED EMBODIMENTS

Figure 1:
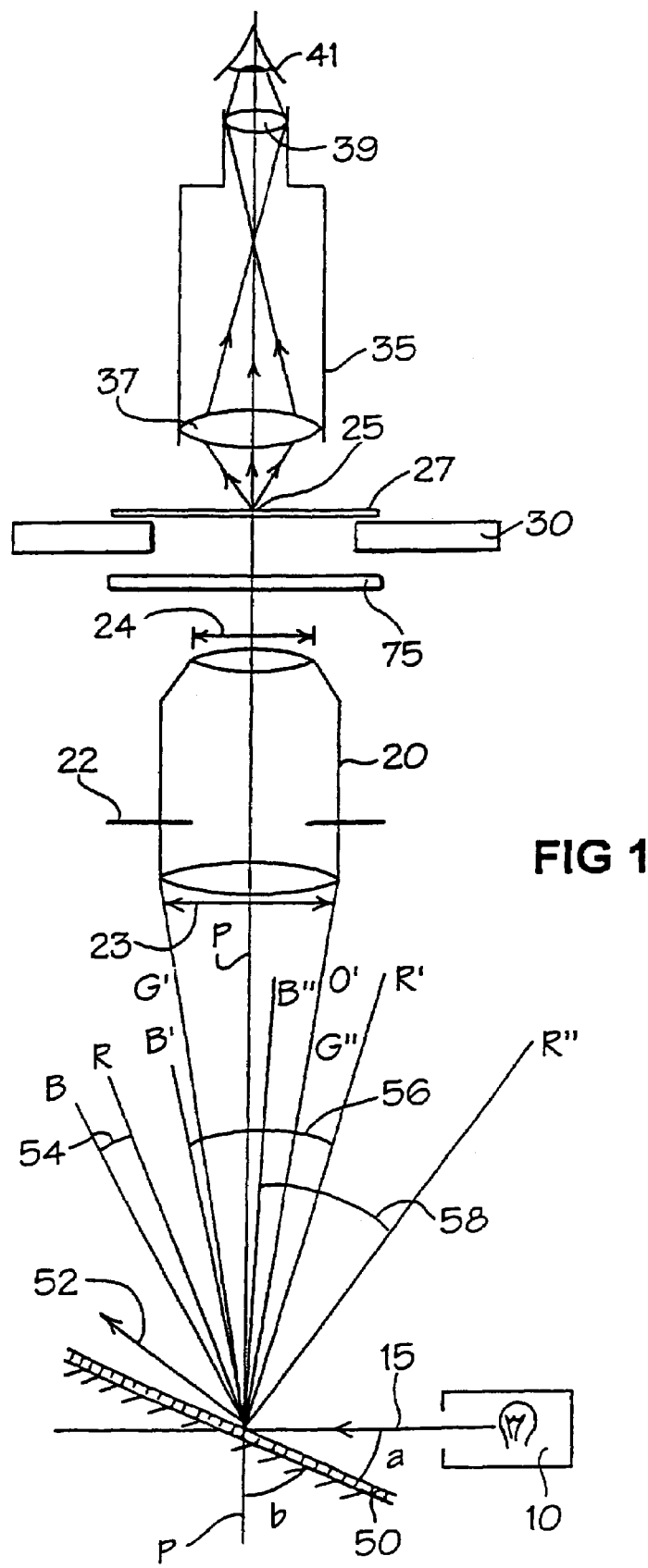
FIG. 1 represents a schematic diagram of a microscope, and light passing through it, according to the present invention.

FIG. 1 shows a microscope modified according to an embodiment of the present invention. As in many conventional microscopes, a light source 10 such as a tungsten incandescent light bulb, or a quartz halogen lamp, or a mercury vapour lamp, provides a beam of polychromatic, preferably white, light 15. The light beam is redirected by a first diffraction grating 50, as will be described later. Part of the redirected light beam passes through an entrance aperture 23 into a condenser 20. The light passes out of the condenser through an exit aperture 24 and via, in a preferred embodiment, a second diffraction grating 75, onto a subject 25 held on a mounting 27, itself supported on a support 30. Part of the light transmitted through the subject and the support enters an objective portion 35 of the microscope comprising an objective lens 37 and an eyepiece 39, to provide an image to an observer 41.

In this particular embodiment, a reflective diffraction grating 50 is provided, located on the optical path of light beam 15 between the light source 10 and the condenser 20.

Light beam 15, comprises a random collection of frequencies of light in the visible range i.e. white light. Light beam 15 is incident on diffraction grating 50 and is split into a number of components. A zero order component 52 comprises white light ordinarily reflected from the surface of the diffraction grating. At the cuter edges of the zero order, different frequencies are diffracted at different angles to produce coloured edges to the order. The blue end of the spectrum is diffracted least and is seen at the edge of the zero order at the smallest angle with respect to the diffraction grating, whilst the red end of the spectrum is diffracted more and is seen similarly at a greater angle with respect to the diffraction grating, a first order spectrum 54 is produced by diffraction, providing a range of frequencies (colours) varying from R (red) (most diffracted) to B (blue) (least diffracted). Further spectra such as second and third order spectra 56, 58, are produced by diffraction, providing a range of frequencies (colours) varying from R' (red) to B' (blue) and from R" (red) to B" (blue) and so on.

High order spectra tend to overlap according to the characteristics of the diffraction grating. The second and third order spectra may overlap to a certain extent, as shown in the figure.

By adjusting the angle of incidence 'a' of light 15 on the diffraction grating 50, and/or the angle 'b' between the diffraction grating and the P of the microscope, the operator may select part of one, or where different orders overlap, more than one, of the spectra 54–58 produced by the diffraction grating 50. Each spectrum represents a range of light frequencies sorted into frequency order. Selecting light from a part of one spectrum, or more than one if the spectra overlap, for supply into the condenser 20 corresponds to supplying a non-white, polychromatic or coloured light comprising a selected set of frequencies having constant relative intensities to one another for that selected set. Similarly, adjusting the angle(s) 'a' and/or 'b' corresponds to selecting a different set of frequencies and/or intensities of frequencies by selecting a different part of the diffracted spectra for supply into the condenser.

To explain further, at greater angles of diffraction as shown in FIG. 1 (the angles of incidence and diffraction are exaggerated in this figure for clarity), overlapping parts of two adjacent spectra (B'-R' (56) and B"-R" (58)) are included in the range of frequencies selected for supply into the condenser. In the example shown in FIG. 1, the condenser 20 receives frequencies corresponding to colours green (G') to orange (O') of the second order spectrum 56, plus colours blue (B") to green (G") of third order spectrum 58. Accordingly, light frequencies corresponding to colours blue to orange are supplied, at relative intensities different to the relative intensities of these colours in incident light beam 15.

The light frequencies and their relative intensities are selected by passage through the entrance aperture 23 and the exit aperture 24 of the condenser. By changing the location, and/or dimensions, of the apertures 23, 24, the selection of frequencies and/or relative intensities may be varied. A variable size aperture such as an iris 22 may be provided within the condenser, to allow for general variation in the intensities of the selected light frequencies, and to adjust the selection of the frequencies, to a certain extent.

By tilting the diffraction grating as shown in FIG. 1 clockwise (i.e. by adjusting the angle of incidence 'a' of incident light 15, or by adjusting the orientation angle 'b' of the diffraction grating with respect to the centerline P and hence subject 25), a different selection of frequencies could be made, for example, colours blue (B') to yellow of the second order spectrum 56, only.

Correspondingly, by tilting the diffraction grating anticlockwise, a different selection of frequencies could be made, for example, colours yellow to red of the second order spectrum 56, plus colours blue (B") to yellow of the third order spectrum 58. Such a selection will contain substantially all visible frequencies of light, but with different relative intensities from the corresponding relative intensities within light beam 15. As will be appreciated by those skilled in the art, it may be possible to select the same set of frequencies, but simply vary their relative intensities. One way of doing this is to vary angle 'a' or 'b' and/or the dimensions of the entrance aperture 23 or the exit aperture 24 of the condenser, or by introducing a limitation on the entrance or exit aperture, or a further aperture in the form of, for example, an iris 22. A further option is to change the frequency content and/or relative intensity within light beam 15.

The selected light frequencies which enter the condenser are condensed, or focused, onto the subject 25 under observation. The subject is then observed through the objective 35 in the normal manner.

It has been appreciated by the inventor that many subjects, particularly biological specimens, react differently to different frequencies (colours) of light. The microscope of the invention takes advantage of this realisation and allows subjects, especially live biological specimens, to be viewed with a clarity, contrast and brightness which, as far as the inventor is aware, has not been possible with similar microscopes before. This has been achieved in a microscope at relatively little cost. Whilst this explanation is not intended to be limiting, the way the invention seems to provide these advantages may be explained as follows.

When white light is used to illuminate a subject, all frequencies of visible light are present, and the resulting image is a combination of the images produced by each frequency. Accordingly, detail of the subject which may be enhanced or picked out by a certain frequency can be obscured by images produced by other frequencies of light so that detail is not picked out. In contrast, if light of a single colour is applied to a subject, features which are enhanced or which react to that particular colour tend to be come easily seen than others, and a meaningful image of the subject may not easily be obtained.

Accordingly to the present invention, a variable selected combination of frequencies of light, each frequency having a certain intensity with respect to the other selected frequencies, is applied to the subject. Accordingly, the features observable with that selected combination of frequencies (colours) at those intensities are visible to the observer. The particular combination of frequencies and relative intensities of frequencies selected can be easily varied to optimise, within the limit of frequencies and intensities available to choose from, the selection for a particular subject 25 under observation. Further, it is thought, without intending to be limiting that the image so produced is less obscured by scattering from within or adjacent to the sample of other colours which do not enhance the image of any particular detail on the subject. Thus, by adjusting the selected combination of frequencies, the details which are picked out in the image may be changed, and the effect of colours which do not enhance any features in the specimen, but rather tend to obscure the overall image, can be limited.

As the reaction of a subject to each frequency of light is individual to that particular subject, it is not possible to generate rules defining an "optimal" setting for the selected frequencies. Thus, it is useful to provide a means for generating a range of frequencies of defined relative intensities, as a function of a variable parameter (here, angles 'a' and/or 'b'). Thus a set of frequencies and intensities can be selected in a consistent and repeatable manner.

Typically, the microscope should be operated as follows. Subject 25 on mount 27 is placed on support 30. Light source 10 is illuminated, the diffraction grating adjusted so that some light is directed into the condenser and onto the subject, and the condenser and the objective are adjusted to produce the best available image. Then, the selected frequencies of light are adjusted, in this case by rotating the diffraction grating, until the best possible image is obtained. It may be necessary to adjust the condenser and/or the objective once the selected range of frequencies has been adjusted.

Thus, a combination of frequencies of light is applied to the subject, the combination of frequencies and their relative intensities being adjustable in a repeatable manner so that the image of features of the subject can be optimised within the limit of the system.

The method of the invention allows undesired frequencies of light to be excluded from the image, avoiding the obscuring effect of such frequencies. Accordingly, the apparent resolution of the microscope of the invention seems to be increased over existing microscopes of comparable optics. The images appear more distinct and bright.

Figure 2:
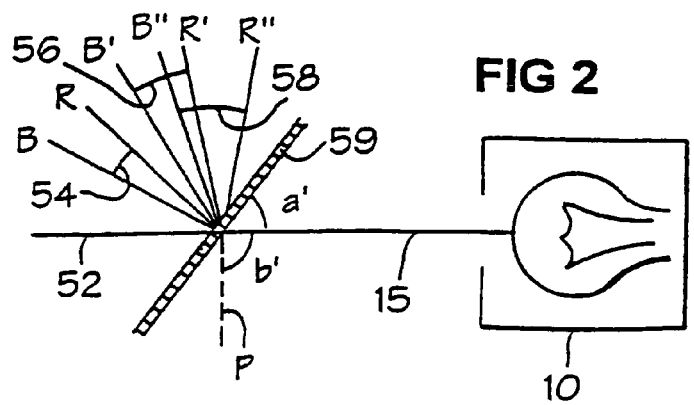
FIGS. 2–4 represent schematic views of alternative light sources, for use with a microscope according to the present invention.
Figure 3:
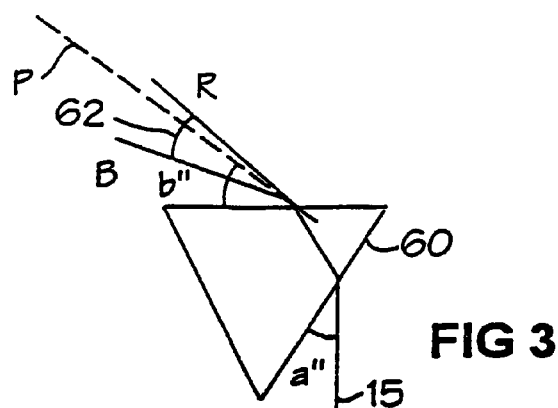
Figure 4:
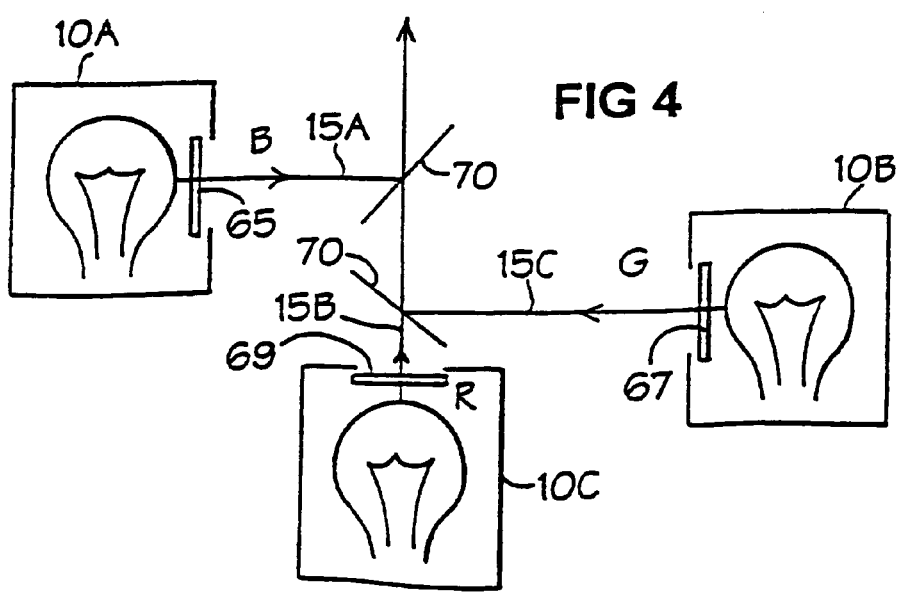

According to alternative embodiments of the present invention, various different means for generating nonwhite, polychromatic or coloured light comprising a selected set of frequencies and relative intensities may be provided, as shown in FIGS. 2–4. Each alternative is provided with suitable means for adjusting the selected set of frequencies and/or relative intensities in a repeatable manner. For example, calcite crystals typically from Iceland, quartz or other birefringement crystals may be used to select the wavelengths required.

FIG. 2 illustrates the use of a transmission diffraction grating 59. A zero order 52 here corresponds to light directly transmitted through the diffraction grating. First 54, second 56, and third 58 order spectra are generated by diffraction of the incoming light, and are similar to the spectra discussed with reference to FIG. 1.

FIG. 3 illustrates the use of a prism 60 to generate a spectrum 62 from the light 15. A single spectrum is typically generated, so continuous sectors of the spectrum 62 may be selected for transmission to the subject using this means for generating non-white, polychromatic or coloured light. Further prisms could be added.

In the case of the sources shown in FIG. 2 or FIG. 3, suitable means for adjusting the selected set of frequencies may comprise means for rotating the grating 59 or the prism 60, and/or the position of the light source 10, relative to the center line of the microscope, to adjust the angles a', a" and/or the angles b', b" illustrated in those figures.

FIG. 4 illustrates a rather different means for generating non-white, polychromatic or coloured light comprising a selected set of frequencies. A number of light sources 10A, 10B, 10C are provided, each including a monochromatic filter 65, 67, 69, for example blue, green and red, respectively. Other monochromatic sources such as lasers may be used, though the cost can be prohibitive. Light 15A, 15B, 15C produced by each coloured source is combined using a series of semi-silvered mirrors 70, or other reflective and transmissive means, such as glass sheets. The selected range of frequencies may be selected by choosing which of the lamps 10A–10C are illuminated at any one time. The relative intensities of the various light frequencies may easily be adjusted by using dimmers to adjust the intensity of each lamp. Such means for generating non-white, polychromatic or coloured light may be further refined by adding further lamps of other colours e.g. cyan, magenta and yellow, to provide a greater selection of frequencies from which to choose the set to illuminate the sample.

Referring again to FIG. 1, according to a further embodiment of the present invention, a transmission diffraction grating 75 may be placed below the subject 25, between the subject and the condenser. This diffraction grating 75 may be used with any of the means for generating polychromatic light, illustrated in FIGS. 1 to 4. It has been found that the presence of this diffraction grating 75 can, for certain subjects, serve to further improve the quality of the image obtained.

Without wishing to be bound by the following description, the inventor believes the improvement seen in the images of subjects especially of living biological matter when a first and/or second (50, 75) diffraction grating are introduced into the path of light illuminating the subject to be due to the following effect. In particular, it is believed that the improvement in the brightness of the image is due to the following effect.

Figure 5A:
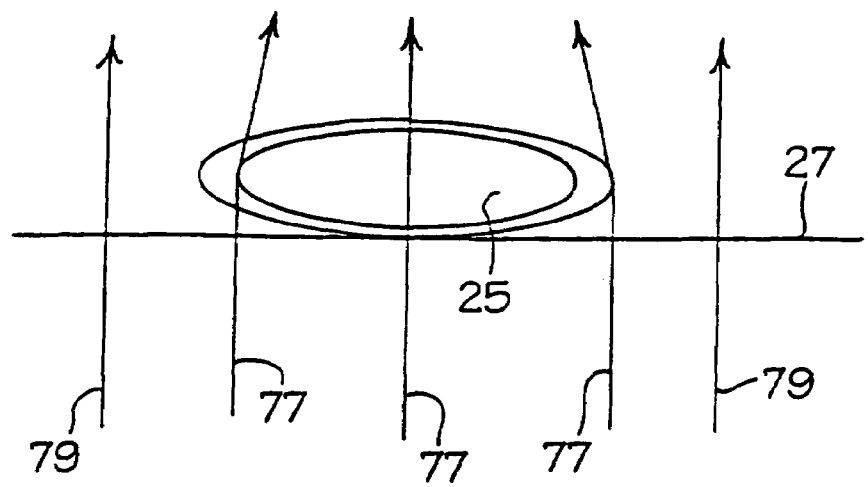
FIGS. 5A and 5B show illumination of a subject without, and with, a transmissive diffraction grating located between the light source and the subject.
Figure 5B:
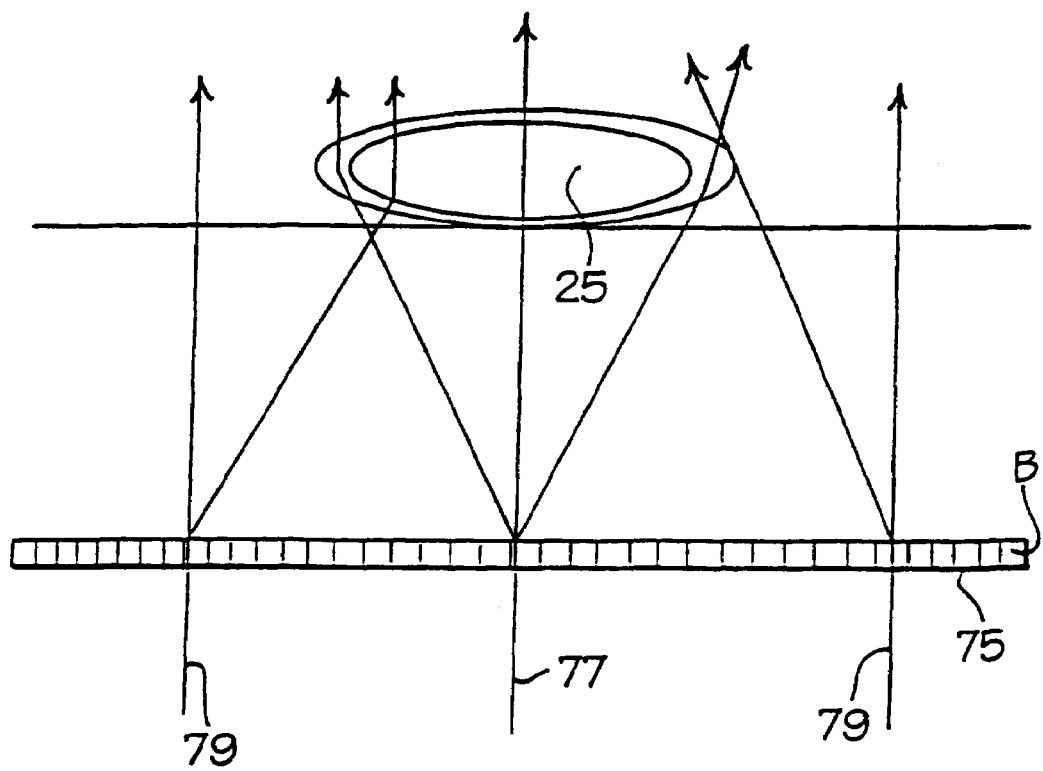

FIGS. 5A and 5B shows a light beam illuminating a subject 25 on a support 27, in the absence of transmission diffraction grating 75, and in the presence of transmission diffraction grating 75, respectively. As shown in FIG. 5A, without the transmission diffraction grating, only light 77 directed at the three-dimensional subject by the condenser reaches the subject, and is available to form an image of the subject. None of light 79 not initially directed towards the subject reaches the subject.

As shown in FIG. 5B, in the presence of the transmission diffraction grating 75 (or indeed grating 50) the light emitted by the condenser is diffracted. Accordingly, some of light 79 which is not initially directed towards the subject and would otherwise miss the subject is diffracted and directed towards the subject 25 and is therefore available to form an image. Much of the light 77 initially directed towards the subject is still received by the subject. Accordingly, the subject 25 seems to receive more light albeit from several different angles of incidence when the transmissive diffraction grating 75 is used. The light is transmitted and scattered by the subject and forms an image.

In addition, use in particular of diffraction grating 75 can improve the image. It seems to homogenise the distribution of the light of different frequencies, and assist in illuminating each part of the subject with each of the selected range of frequencies. However, it is not known for certain that this is how the improvement, seen in the image of certain samples on addition of the second diffraction grating 75 into the path of light just before the sample, works.

A further effect of the microscope of the present invention will now be described. When viewing particularly transparent samples using the microscope of the present invention, the three-dimensional nature of the samples can be observed.

Again, without wishing to be bound by the following description, the inventor believes this improvement to be due to the following effect.

It is well known that many optical systems exhibit chromatic aberration. That is, an optical system will focus light of different frequencies at different points. Similarly, when polychromatic non-white light is incident on a transparent subject, the light of differing frequencies will come into found as differing depths in the subject. If the subject is transparent or partially transparent, images formed of these differing depths can be seen in a single final image. To a lesser extent, light of differing frequencies incident on and reflected from the outer surface of a sample, may show the same effect. The focal length of the eye piece may be varied to look at features at differing depths or ranges of depths in the subject.

Figure 6:
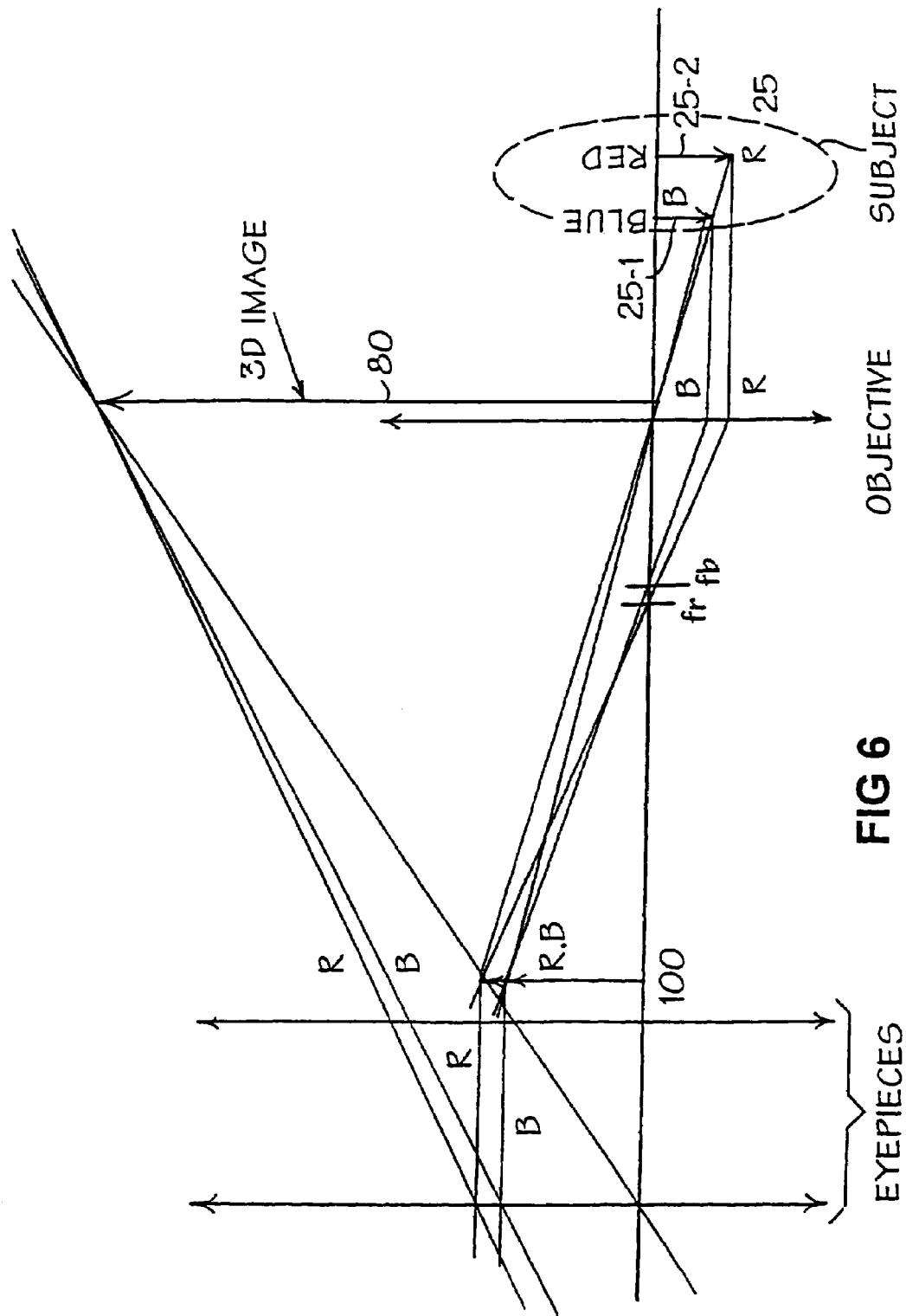
FIG. 6 shows a ray diagram of different frequencies of light from different positions within the subject being brought to a focus in a single image in a microscope of the present invention.

For example, as shown in FIG. 6, an image 80 of a feature close to the surface of the subject 25 may be focused by the objective at a location 100 in light of a blue frequency. An image of a feature below the surface of the subject may be focused by the objective at the same location 100 in red light. Accordingly, a single image 60 visible to a user in a single plane may contain images corresponding to several layers 25-1, 25-2 of the subject 25. If white light is applied to the subject, all images resulting from features at infinitesimally close layers are visible, leading to a generally blurred image. If only monochromatic light is used, only features at the corresponding depth will be visible. However, by using non-white polychromatic or coloured light comprising an optimised selected set of frequencies, only images corresponding to certain selected depths are formed. This seems to lead to a clearer image, and some degree of three-dimensional effect, whereby features appearing at different depths within the subject appear in different colours or different mixtures of colours.

The use of a diffraction grating 50 allows variation in intensity and frequency of the selected group of frequencies, simply and easily, in a consistent and repeatable manner.

The microscope of the invention delivers improved performance when second diffraction grating 75 is used in addition to the first diffraction grating 50, or the alternatives shown in FIGS. 2–4. However, at least some of the advantages of the present invention may be obtained in a microscope having the second diffraction grating 75 only, or the first diffraction grating 50 (or its alternatives shown in FIGS. 2–4) only. Alternative sources of light and means for varying the frequencies and/or intensities of a light beam to those described may also be envisaged and fall within the scope of this application.

EXAMPLE

An example of a microscope according to the present invention, suitable for use in viewing biological subjects (such as paramecium, of typical size 100 microns in a sample of pond water is as follows:
Reflective diffraction grating 50:1,000 lines/mm
Transmission diffraction grating 75:600 lines/mm
Condenser: Abbe 1.2NA (Numerical Aperture)
Objective: Beck 10x 0.25NA
Eyepieces: 10x and 20X HUZERNN types
Microscope: Beck 47 monocular compound microscope
Light source: 40W tungsten incandescent lamp.

In a particular set-up, the angles 'a' and 'b' may be fixed such that (a+b)=90°. Using the above-described example reflective diffraction grating, an angle of 32° will provide a green/yellow spectrum part towards the condenser 20. A variation of angle 'a' of +/− 2° will produce a change on the range of frequencies of light entering the condenser.

Although the present invention has been described with reference to certain particular embodiments, the present invention may be applied to other types of microscope. The inventor has found the present invention to be applicable to many types of transmission optical microscopes. The method of using a microscope according to the present invention may be applied to any type of subject under observation.

The invention may be usefully applied to dark-field or phase contrast microscopes. A dark field microscope may include an opaque disk with an annular aperture, within the condenser. This prevents any light 77 (FIGS. 5A, 5B) from entering the objective, the subject being illuminated only by peripheral light 79. An alternative dark field microscope has the condenser angled with respect to the centreline P of the microscope so that the light from the condenser does not directly enter the objective. In either technique, the amount of light available to form an image is reduced, and the apparent increase in definition and brightness of image provided by the present invention enables dark field techniques to be advantageously employed. Similarly, phase contrast techniques may be employed. A phase contrast technique includes an opaque disk with an annular aperture in each of the condenser and the objective. By applying the modifications according to the present invention, a phase contrast improved image may be produced, corresponding to each of the selected frequencies. Phase contrast techniques have hitherto been applied only to monochromatic imaging.

By rearranging the various components of the microscope, a reflective type of microscope may be provided, in which the subject is illuminated from the same side as it is observed through the objective. The second diffraction grating 75, if used, will be placed in the path of illumination, before the subject. For such improved reflective microscopes, as for the transmission microscopes, at least some of the advantages of the present invention may be obtained in a microscope having the second diffraction grating 75 only, or the first diffraction grating 50 (or its alternatives shown in FIGS. 2–4) only.

What is claimed is:

1. A transmission microscope, comprising:
   a polychromatic light source, the light source being a non-oscillating and non-vibrating source of polychromatic light;
   an objective lens for viewing a subject;
   an optical path connecting the light source, via the subject to be viewed, to the objective lens, the optical path being free of filters;
   a first non-oscillating and non-vibrating diffraction grating located in the optical path between the light source and the subject;
   an adjustable aperture, with an adjustable aperture size, following the first grating;
   a second non-oscillating and non-vibrating diffraction grating following the aperture downstream of the first grating and upstream of the subject in the optical path;
   tilting means for tilting a plane of the first diffraction grating relative to a line of light in the optical path, wherein,
   the first grating diffracts light, from the light source, incident on the first diffraction grating into a plurality of overlapping spectra,
   the tilting means is operable to select a set of frequencies from the overlapping spectra and direct the selected set of frequencies along the optical path to the subject,
   the adjustable aperture is operable to further select a subset of the selected set of frequencies to illuminate the subject by adjusting the aperture size,
   a plane of the second grating is generally normal to the optical path, and
   the subject is illuminated with any one of a plurality of combinations of frequencies having predetermined fixed intensities relative to one another, as defined by selecting different subsets of the selected set of frequencies by repeated adjustment of the aperture size.

2. A microscope according to claim 1 in which the selected combination of frequencies comprises a continuous part of a frequency spectrum.

3. A microscope according to claim 1 in which the light source is a source of white light.

4. A microscope according to claim 1 in which the light source comprises an incandescent light bulb.

5. A method of operating a transmission microscope, comprising the steps of:
   providing a non-oscillating and non-vibrating source of polychromatic light and a first non-oscillating and non-vibrating diffraction grating in an optical path of light from the light source, via a subject to be viewed, to an objective lens for viewing the subject;
   providing an adjustable aperture, with an adjustable size, following the first grating;
   providing a second non-oscillating and non-vibrating diffraction grating downstream of the first grating and upstream of the subject in said optical path;
   maintaining the optical path between the light source and the subject free of any filters;
   tilting a plane of the first grating relative to the optical path of the light incident on to the first grating to diffract the light from the source into a plurality of overlapping spectra;
   optimizing the clarity of an image of the subject, while viewing the image, by adjusting a tilt of the first diffraction grating to select a set of frequencies from the overlapping spectra that optimize the clarity of the image being viewed; and
   further optimizing the clarity of the image being viewed, while viewing the image, by adjusting the size of the adjustable aperture to further select a subset of said selected set of frequencies such that the subject is illuminated with the selected subset of frequencies, wherein,
   the selected subset of said selected set of frequencies has predetermined fixed intensities relative to one another, and
   said further optimizing step is repeatable to select different subsets of said selected set of frequencies.

6. A method according to claim 5 in which the selected combination of frequencies comprises a continuous part of a frequency spectrum.

7. A method according to claim 5 in which the light source is a source of white light.

8. A method according to claim 5 in which the light source comprises an incandescent light bulb.

9. A method of manufacturing a transmission microscope, comprising the steps of:

providing a microscope comprising a non-oscillating and non-vibrating source of polychromatic light, a condenser, a position for a subject to be viewed, and an objective lens;

inserting a first non-oscillating and non-vibrating grating in a optical path between the source of polychromatic light and the condenser;

arranging the first diffraction grating to be tiltable, relative to a line of the optical path, to change an angle of incidence of the polychromatic light on the first diffraction grating;

providing an adjustable aperture in the optical path upstream of the first diffraction grating and downstream of the position for the subject;

inserting a second non-oscillating and non-vibrating diffraction grating oriented generally normal to the optical path, upstream of the condenser and downstream of the subject; and maintaining the optical path free of filters when viewing the subject, wherein, the subject can be illuminated with any one of a plurality of combinations of frequencies having predetermined fixed relative intensities to one another defined by the selected combination in a repeatable manner.

* * * * *